(12) United States Patent
Hegenbart et al.

(10) Patent No.: US 12,429,079 B2
(45) Date of Patent: Sep. 30, 2025

(54) FASTENING ELEMENT WITH SELECTIVELY ELONGATABLE BODY

(71) Applicant: Airbus Operations GmbH, Hamburg (DE)

(72) Inventors: Matthias Hegenbart, Hamburg (DE); Hermann Benthien, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 18/654,189

(22) Filed: May 3, 2024

(65) Prior Publication Data

US 2024/0392820 A1 Nov. 28, 2024

(30) Foreign Application Priority Data

May 24, 2023 (EP) .................................... 23175049

(51) Int. Cl.
*F16B 5/06* (2006.01)
*B64C 1/00* (2006.01)

(52) U.S. Cl.
CPC .............. *F16B 5/0621* (2013.01); *B64C 1/00* (2013.01)

(58) Field of Classification Search
CPC .... F16B 5/0621; F16B 2/185; F16B 13/0841; F16B 19/002; F16B 2/04; F16B 2019/006; B64C 1/00
See application file for complete search history.

(56) References Cited

U.S. PATENT DOCUMENTS

| | | | | |
|---|---|---|---|---|
| 5,259,689 A * | 11/1993 | Arand | ...................... | F16D 1/033 403/337 |
| 8,177,465 B2 * | 5/2012 | Brandt | .................. | H05K 5/0204 73/756 |
| 11,428,257 B2 * | 8/2022 | Stevick | .................... | C22C 45/00 |
| 11,802,583 B2 * | 10/2023 | Stevick | .................... | F16B 21/06 |
| 2009/0238657 A1 * | 9/2009 | Brandt | ..................... | B60R 21/01 411/44 |
| 2020/0096031 A1 * | 3/2020 | Stevick | .................... | C22C 45/00 |
| 2021/0361130 A1 | 11/2021 | Delaney | | |
| 2022/0364588 A1 * | 11/2022 | Stevick | ............... | F16B 19/1036 |

FOREIGN PATENT DOCUMENTS

| | | |
|---|---|---|
| DE | 29804519 U1 | 6/1998 |
| DE | 202015103074 U1 | 7/2015 |
| GB | 774002 A | 5/1957 |

OTHER PUBLICATIONS

European Search Report for corresponding European Patent Application No. 23175049.8 dated Oct. 24, 2023.

* cited by examiner

*Primary Examiner* — Lawrence Averick

(74) *Attorney, Agent, or Firm* — Greer, Burns & Crain, Ltd.

(57) ABSTRACT

A fastening element for fastening a first component to a second component. The fastening element includes an elastically deformable body and an elongated actuating member. The actuating member is movably guided relative to the body to be selectively movable further into or further out of the body. The body is configured to be elongated by moving the actuating member further into the body and applying a corresponding load onto the body and to elastically deform back by moving the actuating member further out of the body and releasing the load applied thereto. Further, the body is configured to have a smaller outer diameter when correspondingly elongated than when non-elongated and/or deformed back.

14 Claims, 5 Drawing Sheets

FASTENING ELEMENT WITH SELECTIVELY ELONGATABLE BODY

CROSS-REFERENCES TO RELATED APPLICATIONS

This application claims the benefit of European Patent Application Number 23175049.8 filed on May 24, 2023, the entire disclosures of which are incorporated herein by way of reference.

FIELD OF THE INVENTION

The present invention relates to a fastening element for fastening a first component to a second component. Further, the invention relates to a method for fastening a first component to a second component. In addition, the invention relates to an aircraft comprising at least one such fastening element.

BACKGROUND OF THE INVENTION

There are numerous applications conceivable for a fastening element for fastening a first component to a second component. By way of example, in an aircraft, vehicle, or the like, such fastening element may be used to fasten, for example, a cladding part or the like, as an example for one component, to a structural part, as an example for another component. It can be challenging that vibrations, oscillations, shocks, or the like may be transferred between the two components via the fastening element. In addition, it may be challenging that fastening elements are often designed for a clip connection, snap connection, or the like, which can be cumbersome to install, in particular in high volumes.

SUMMARY OF THE INVENTION

One of the objects of the invention is to provide improved solutions for fastening a first component to a second component.

According to a first aspect, there is provided a fastening element for fastening a first component to a second component. The fastening element comprises an elastically deformable body. Further, the fastening element comprises an elongated actuating member. The actuating member is guided movable relative to the body to be selectively movable further into or further out of the body. The body is configured to be elongated by moving the actuating member further into the body and applying a corresponding load onto the body. Further, the body is configured to elastically deform back by moving the actuating member further out of the body and releasing the load applied thereto. In addition, the body is configured to have a smaller outer diameter when correspondingly elongated than when non-elongated and/or deformed back.

This configuration allows the fastening element to be easily manufactured, easily installed and/or easily used to fasten the first component to the second component in just a few steps or even in an at least partially or completely automated manner. To install the fastening element, simply actuate the actuating member to elongate the body, thereby reducing the outer diameter of the body, insert the elongated body having the smaller and/or reduced outer diameter into an opening or housing, and widen the body with respect to its outer diameter again thereby releasing the actuating member and/or the load from the body. The re-deformed body may accomplish a form-fit connection, wherein a combined form-fit and force-fit connection is also possible. Due to the elastic body, i.e., the elastically deformable body, the fastening element may also serve for vibration damping, shock absorbing, sound insulation, heat insulation, or the like. For example, the elastically deformable body may serve as a load introduction part, a shock absorber, a sound barrier, a self-locking mechanism, for click and snap one-step installation, a form-fit connector, for encapsulation so as to enable fire smoke toxicity (FST) compliance, a self-helping mechanism when being under load, etc.

As used herein, the first component may be any component that is to be fastened to another component, such as a structural part or the like. For example, the first component may be any kind of cladding part, e.g., interior cladding part, a further structural part, or the like, of an aircraft, vehicle or the like. By way of example, the second component may be any component capable of supporting a load or the like. For example, it may be a structural component or part of an aircraft, vehicle or the like. The first and second components are not limited herein, however, and a plurality of different components may be attached to each other by using the fastening element. Further, by way of example, the fastening element may be applied to an aircraft, a vehicle, or the like.

Further, as used herein, the body of the fastening element may have material properties, particularly an elastic property, that make it elongatable, stretchable, or the like under, e.g., tensile, load and return at least substantially to its original shape without load. Accordingly, the body may be elongated, e.g., stretched, by applying the corresponding load thereto by using the actuating member. When the material of the body is elongated, e.g., stretched, it distributes along a corresponding elongation axis, e.g., stretch axis, reducing the outer diameter of the body accordingly. When the actuating member then releases the load from the body again, the body may return at least substantially or completely to its original, i.e., unloaded, shape. Accordingly, the material of the body is then no longer distributed along the elongation axis, but is again concentrated in less space, so that the outer diameter of the body is again larger compared to the elongated state. Also, the elastic and/or soft material properties of the body may also contribute, for example, to vibration damping, sound insulation, thermal insulation, or the like. The elongated, e.g., stretched and/or loaded, state of the body may serve for installation of the fastening element. The re-deformed and/or non-elongated, e.g., unstretched and/or unloaded, state of the body may serve as the intended installed state after installation.

The fastening element may be made of one or more plastic materials. For example, the fastening element may be manufactured by multi-component injection molding or the like. Accordingly, the actuating member may be formed at least sectionally onto the body. The actuating member may, for example, be made of a suitable plastic material. The plastic material of the actuating member may have higher mechanical strength than a material of the body. At least, the actuating member is at least substantially non-elastic.

To fasten the first component to the second component, in the installed state, the body may face or be associated with the second component, for example, and the first component may be fastened to, e.g., the actuating member or another section of the fastening element. Further, by way of example, one of the first and the second component may be fastened and/or attached to the fastening element by using an insulation, a Velcro fastener, a lining, a toothed plate, a rotary joint, a lug connection, or the like.

According to at least some embodiments, the fastening element may be configured to be inserted into an opening of one of the first component and the second component when the body is elongated, stretched, or the like. The fastening element may be further configured to make at least a form-fit connection with the opening and/or with the one of the first component and the second component when the body is non-elongated and/or deformed back. Alternatively, the fastening element may be configured to be inserted into a housing, e.g., through an opening of the housing, when the body is elongated, stretched, or the like. The fastening element may be further configured to make at least a form-fit connection with the housing when the body is non-elongated and/or deformed back. This makes the fastening element easy to install and provides a robust connection.

In at least some embodiments, the actuating member may comprise a pin-shaped section insertable or inserted at least in sections into the body and contactable or contacted with an inner side of the body. For example, the pin-shaped section may be at least sectionally inserted into the body with a longitudinal end. The corresponding longitudinal end may then abut the body from inside and elongate it, e.g., stretch it, according to the inward movement. Due to the pin shape, the actuating member requires only little installation space. In addition, this is a structurally simple design, which can also be manufactured easily.

According to at least some embodiments, a longitudinal end of the actuating member facing the body may have a contact surface configured to be brought into contact with an inner side of the body. For example, the contact surface may have a larger surface than other sections of the actuating member. This may keep the force per area acting on the body low so that the body is not punctured. Furthermore, the contact surface may be configured to have good adhesion properties with respect to the body. For example, the contact surface may be toothed.

In at least some embodiments, the fastening element may comprise a guiding member fixed relative to the body and having a bushing section to guide the actuating member therein. The guiding member may also be a section of the actuating member. The guiding member may be manufactured from the same or a different plastic material as the fastening element. The bushing section may extend into the body to provide rigid guidance for the actuating member, e.g., its pin-shaped section. For example, the actuating member may have a bushing with a pin guided therein. The pin may be movable within the bushing along its longitudinal direction to selectively elongate or relax the body.

According to at least some embodiments, the guiding member may comprise an interface section arranged outside the body for gripping by a hand of a user and/or for attaching one of the first component and the second component thereto. For example, the interface section may be configured similar to a syringe, so that it can be operated with, in principle, three fingers. The interface section may serve as a kind of abutment when the actuating member is pressed into the body, similar to the plunger of a syringe. Additionally or simultaneously, the interface section or a longitudinal end of the actuating member facing away from the body may be configured to or serve to attach one of the first component and the second component thereto.

In at least some embodiments, the body may comprise a first section having a first degree of hardness and an adjoining second section having a second degree of hardness. The second section may have a lesser hardness than the first section. For example, the hardness may be indicated by, e.g., shore hardness, or the like. For example, the softer section may form a longitudinal end of the body. Due to the softer material properties of this section, the body, in particular when non-elongated, may have an even larger outer diameter than the other section of the body, which is harder compared thereto. This allows a rivet-like shape of the body, especially after its installation and/or when non-elongated, and/or a rivet-like connection.

According to at least some embodiments, the body may comprise a shoulder section radially expanded and a section elongatable by the actuating member. For example, the section elongatable may be inserted through an opening. The shoulder may then abut at the corresponding component having the opening. The abutting shoulder section may further improve the installation of the fastening element.

In at least some embodiments, the fastening element may further comprise a housing. The housing may have an opening. Further, the housing may be configured to selectively accommodate at least a section of the body. The body may be configured to be insertable through the opening into the housing when elongated and may intersect with the housing when non-elongated and/or deformed back. Thus, there may be provided a fit-fit connection between the fastening element and the housing. For example, the housing may be fastened and/or attached to one of the first component and the second component. Alternatively or additionally, the housing may be integrally formed with one of the first component and the second component.

According to at least some embodiments, the housing may be configured to be fastened and/or attached to one of the first component and the second component. The other one of the first and second component may be fastened and/or attached to the fastening element. For example, a housing may be attached to the one of the first component and the second component by welding, a screw connection, or any other suitable joining technique, or may be formed integrally therewith.

In at least some embodiments, the housing may comprise an accommodation compartment configured to at least partially and/or sectionally accommodate the body. The accommodation compartment may be configured to be at least substantially airtightly sealable by the body. For example, an opening of the housing may open into the compartment. This opening may be at least partially closed by the body inserted in the compartment, like a plug that closes an opening, in this case from the inside, i.e., from the compartment-side. By varying the outer diameter of the body, i.e., by moving the actuating member relative to the body, this may generate a negative pressure, possibly a substantial vacuum, inside the housing. This allows an even stronger, more reliable and/or more robust fastening to be achieved.

According to at least some embodiments, the body may be formed from an elastic plastic material, particularly a rubber and/or an elastomer. The material used should have elastic properties. For example, the material may be selected from rubber, e.g., any vulcanizate of natural and synthetic rubbers, styrene-butadiene rubber, butadiene rubber (BR), acrylonitrile-butadiene rubber (NBR), butyl rubber (IIR), ethylene-propylene-diene rubber (EPDM), chloroprene rubber (CR), polyisoprene rubber (IR), and any suitable elastomer.

According to a second aspect of the invention, there is provided a method for fastening a first component to a second component. The method comprises providing a fastening element according to the first aspect. Further, the method comprises elongating the body of the fastening element by moving the actuating member further into the body and inserting the elongated body into an opening of one of the first component and the second component or into an opening of a housing coupled to one of the first component and the second component. In addition, the method comprises moving the actuating member further out of the body to expand the outer diameter of the body and to effect at least a form-fit connection with the one of the first component and the second component or with the housing.

Accordingly, the fastening element according to the first aspect or any of the embodiments as described herein may be used to fasten the first component to the second component. The method may be modified according to any embodiment of the fastening element described herein. The method provides a structurally simple and robust fastening option that is also easy to install.

In at least some embodiments, the method may further comprise attaching the other one of the first component and the second component to the fastening element, particularly to the actuating member. For example, the other one of the first and the second component may be fastened and/or attached to the fastening element by using an insulation, a Velcro fastener, a lining, a toothed plate, a rotary joint, a lug connection, or the like.

According to a third aspect of the invention, there is provided an aircraft. The aircraft comprises at least one fastening element according to the first aspect used for fastening a first component to a second component of the aircraft.

Another aspect of the invention provides an arrangement of a first component and a second component. One of the first and the second component may be fastened to the other by using at least one fastening element as described herein.

The above configurations and refinements may be combined with one another as desired where expedient. Further possible embodiments, refinements and implementations of the invention also encompass combinations, which are not explicitly mentioned, of features of the invention described above or below with regard to the exemplary embodiments. In particular, a person skilled in the art will also add individual aspects as improvements or additions to the respective basic form of the present invention.

BRIEF DESCRIPTION OF THE DRAWINGS

The present invention is explained in more detail below with reference to the embodiments shown in the schematic figures.

Figure 1:
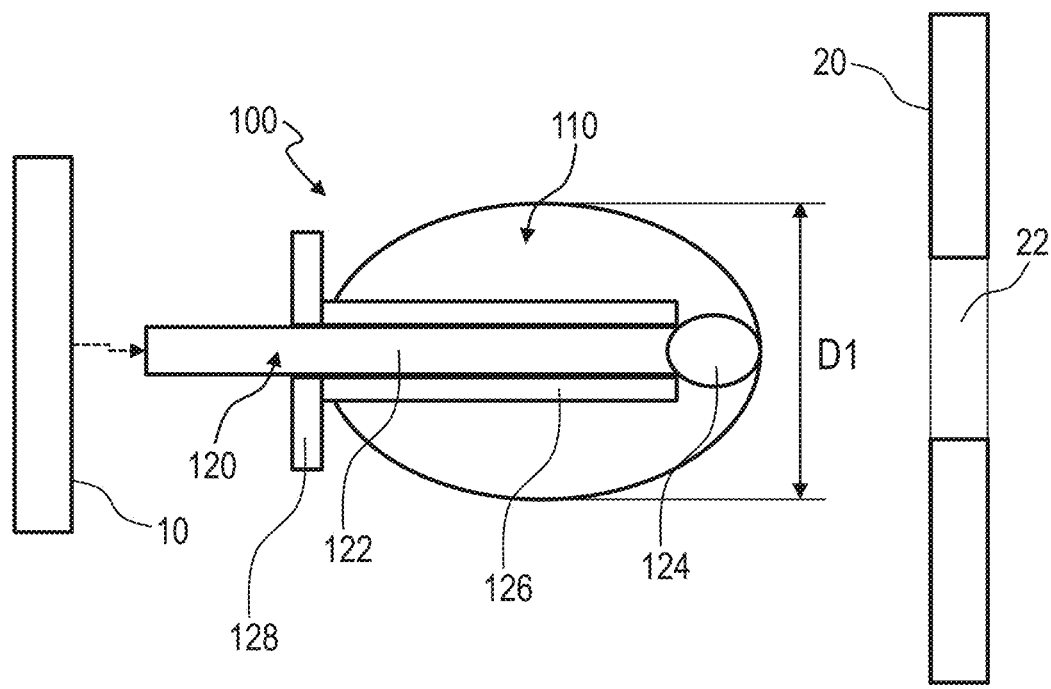
FIG. 1 illustrates an exemplary, non-elongated fastening element for fastening a first component to a second component, according to an embodiment.

In the figures of the drawing, elements, features and components which are identical, functionally identical and of identical action are denoted in each case by the same reference designations unless stated otherwise.

DETAILED DESCRIPTION OF THE PREFERRED EMBODIMENTS

FIG. 1 illustrates a fastening element 100 for fastening a first component 10 to a second component 20. The second component 20 may be, for example, a structural part of, e.g., an aircraft, vehicle, or the like. The first component 10 may be, for example, any part that is to be fastened to the second component 20, such as a cladding part, a further structural part, or the like. It is understood that the first component 10 and the second component 20 are not limited to these examples, but the fastening element 100 may also fasten differently configured components to each other. In this example, the second component 20 may have an opening 22, through which the fastening element 100 may be inserted depending on its state.

As will become even clearer from the following description, the fastening element 100 according to FIG. 1 is in an unactuated, non-elongated state.

The fastening element 100 comprises an elastically deformable body 110. The body 110 of the fastening element has material properties, e.g., elastic properties, that make it elongatable, stretchable, or the like under, e.g., tensile load and return at least substantially to its original shape without load. For example, the body 110 may be formed from an elastic plastic material, particularly a rubber and/or an elastomer. By way of example, the material may be selected from rubber, e.g., any vulcanizate of natural and synthetic rubbers, styrene-butadiene rubber, butadiene rubber (BR), acrylonitrile-butadiene rubber (NBR), butyl rubber (IIR), ethylene-propylene-diene rubber (EPDM), chloroprene rubber (CR), polyisoprene rubber (IR), and any suitable elastomer.

Further, the fastening element 100 comprises an elongated actuating member 120. The actuating member 120 is movably guided relative to the body 110 to be selectively movable further into or further out of the body 110. Further, the body 110 is configured to be elongated by moving the actuating member 120 further into the body 110 and applying a corresponding load onto the body 110. Likewise, the body 110 is configured to elastically deform back, i.e., relax, by moving the actuating member 120 further out of the body 110 and releasing the load applied thereto. Further, the body 110 is configured to have a smaller outer diameter when correspondingly elongated than when non-elongated and/or deformed back, i.e., when relaxed.

In the unactuated, non-elongated state according to FIG. 1, the actuating member 120 is rather moved further out of the body 110. Accordingly, the body 110 has a first outer diameter D1, which is relatively large. According to FIG. 1, the first outer diameter D1 is, for example, larger than a diameter (not denoted, however, see FIG. 2) of the opening 22 of the second component 20.

It is noted that the first component 10 may be attached, fastened, etc. to, e.g., one longitudinal end of the actuating member 120, as indicated in FIG. 1 by a dashed arrow. For example, the first component 10 may be fastened and/or attached to the fastening element 100 by using an insulation, a Velcro fastener, a lining, a toothed plate, a rotary joint, a lug connection, or the like. This may be done before, during, or after the fastening element 100 is installed at the second component 20.

Figure 2:
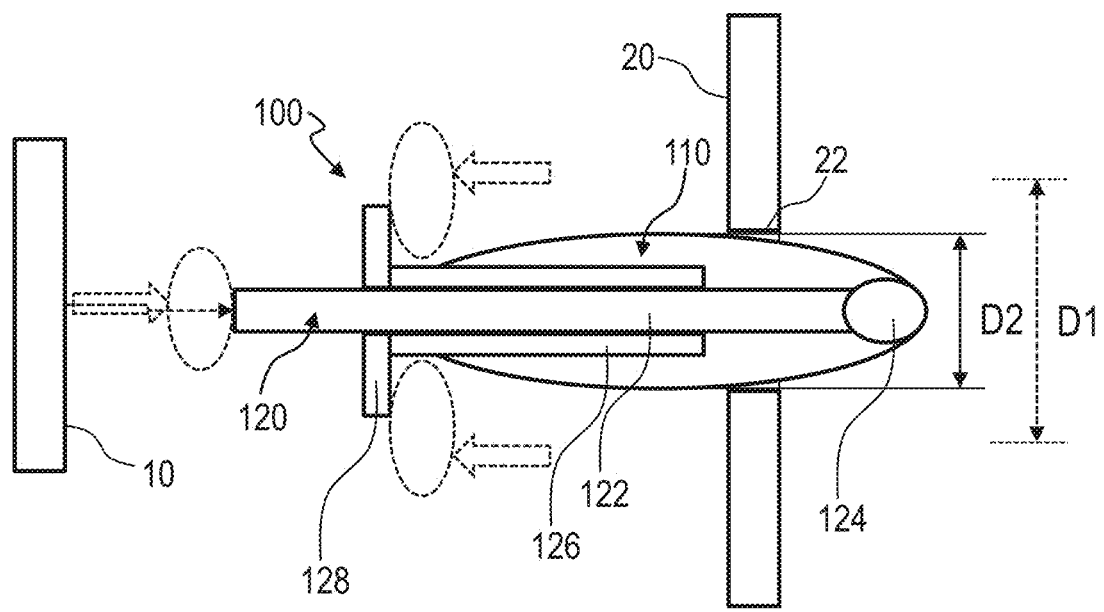
FIG. 2 illustrates an exemplary, elongated fastening element for fastening a first component to a second component, according to an embodiment.

FIG. 2 illustrates the fastening element 100 now in the actuated, elongated state mentioned above, i.e., a state in which the body 110 is elongated, in particular elongated by stretching, by actuation of the actuating member 120. Accordingly, in FIG. 2, the body 110 has a second diameter D2, which is smaller than the above-mentioned first diameter D1, which is also shown in dashed lines in FIG. 1 for better illustration. As described above, the smaller second diameter D2 is caused by the actuating member 120 moving further into the body 110 compared to the condition shown in FIG. 1, causing the actuating member 120 to stretch and thereby elongate the body 110 along a longitudinal axis defined by, inter alia, the actuating member 120.

In the actuated, elongated state according to FIG. 2, the actuating member 120 is rather moved further into the body 110. Accordingly, the body 110 has the second outer diameter D2, which is relatively small. According to FIG. 2, the second outer diameter D2 is, for example, at least slightly smaller than the diameter of the opening 22 of the second component 20. Accordingly, the body 110 may now be inserted into and/or through the opening 22. It is understood that in case the body 110 is again deformed by moving the actuating member 120 out again, thereby relaxing the body 110 along this axis, the body 110 again becomes larger in its outer diameter. In this way, a form-fit, and possibly also a force-fit, connection between the fastening element 100 and the second component 20 may be accomplished.

It is noted that FIG. 2 also indicates a possible way of actuating the fastening element 100. For example, FIG. 2 indicates fingers of a user's hand with three dashed ovals and three dashed arrows. This is at least remotely similar to the actuation of a syringe, wherein the actuating member 120 may be moved relative to the body 110 in a manner similar to a plunger of a syringe using, for example, the thumb. If, for example, the thumb presses the actuating member 120 further into the body 110, the body 110 is correspondingly elongated by the load thereby applied. If the load exerted by, for example, the thumb on the actuating member 120 is released, the elastic body 110 returns to its original, non-elongated shape. If necessary, the actuating member 120 may also be actively pulled out again. Accordingly, the fastening element 100 can also be installed without tools. It should be noted, however, that at least partially automated actuation is also possible, for example by using a memory shape alloy, an electro active polymer, or the like.

Still referring to FIG. 1 and/or FIG. 2, some optional features of the fastening element 100 will be explained in the following.

In at least some embodiments, the actuating member 120 may comprise a pin-shaped section 122 insertable or inserted at least in sections into the body 110. The pin-shaped section 122 may be configured to be brought into contact with an inner side of the body 110.

Further, in at least some embodiments, a longitudinal end of the actuating member 120 facing the body 110 may have a contact surface 124 configured to be brought into contact with an inner side of the body 110. For example, the contact surface 124 may have a larger surface than other sections of the actuating member 120. Further, the contact surface 124 may be configured to have good adhesion properties with respect to the body 110. For example, the contact surface 124 may be toothed, or the like.

Furthermore, in at least some embodiments, the fastening element 100, e.g., the actuating member 120, may comprises a guiding member 126 fixed relative to the body 110 and having a bushing section to guide the actuating member 120 therein. Also, in at least some embodiments, the guiding member 126 may comprise an interface section 128 arranged outside the body 110 for gripping by a hand of a user and/or for attaching, as here in this example, the first component 10 thereto.

The fastening element 100 may be made of one or more plastic materials. For example, the fastening element 100 may be manufactured by multi-component injection molding or the like. Accordingly, the actuating member 120 may be formed at least sectionally onto the body 110. The actuating member 120 may, for example, be made of a suitable plastic material. The plastic material of the actuating member 120 may have higher mechanical strength than a material of the body 110. At least, the actuating member 120 is at least substantially non-elastic.

With reference to FIG. 3A to FIG. 5, an exemplary installation of the fastening element 100 in an opening, e.g., the above-mentioned opening 22 of the second component 20, will now be explained in the following.

It is noted that this exemplary installation may be performed using the fastening element 100 of FIG. 1 and FIG. 2. However, FIG. 3A to FIG. 3C will also be used here to explain further optional features of the fastening element 100.

Figure 3A:
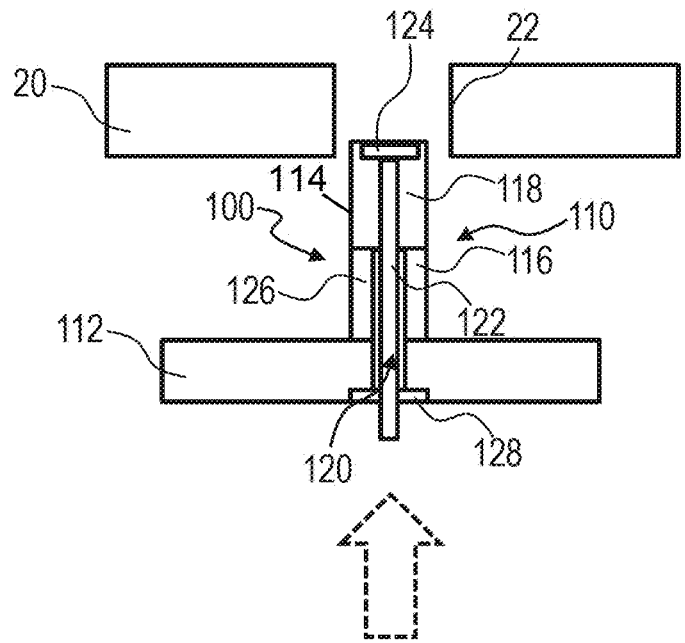
FIGS. 3A-3C illustrate an exemplary installation of the fastening element into an opening, e.g., an opening of a second component.
Figure 3B:
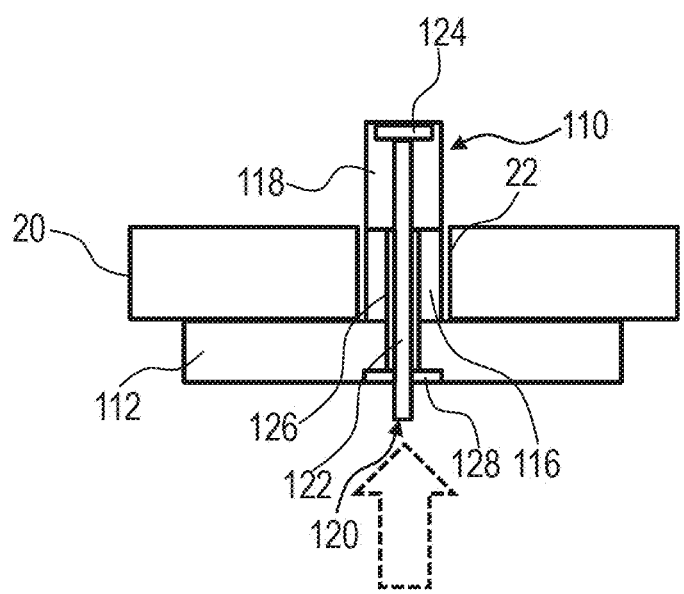
Figure 3C:
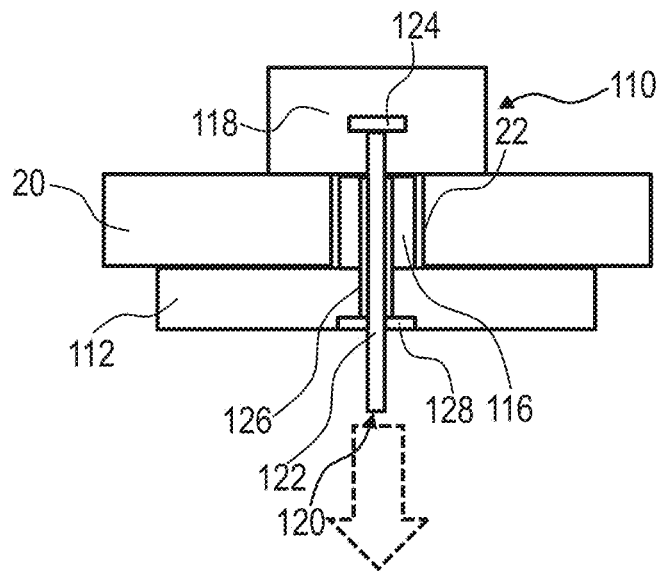

First, referring to FIG. 3A, the actuating member 120 may be moved further into the body 110 to elongate it as described above. Accordingly, the body 110 shown in FIG. 3A has the relatively small outer diameter, i.e., the second outer diameter D2. Then, referring to FIG. 3B, the fastening element 100, particularly the body 110, may be inserted into the opening 22 of the second component 20. Optionally, as indicated in FIG. 3B, the fastening element 100, e.g., the body 110, may comprise a shoulder section 112 radially expanded and a section 114 that is elongatable by the actuating member 120 as described above. The shoulder section 112 may be positioned to abut the second component 20. Then, referring to FIG. 3C, the actuating member 120 may be moved further out of the body 110, causing it to return to its original shape or state due to its elasticity. Optionally, as indicated in FIG. 3C, the body 110 may comprise a first section 116 having a first degree of hardness and an adjoining second section 118 having a second degree of hardness, wherein the second section 118 has a lesser hardness, i.e., is softer, than the first section 116. With this optional embodiment of the body 110, a shape similar to a rivet as indicated in FIG. 3C may be obtained.

Figure 4:
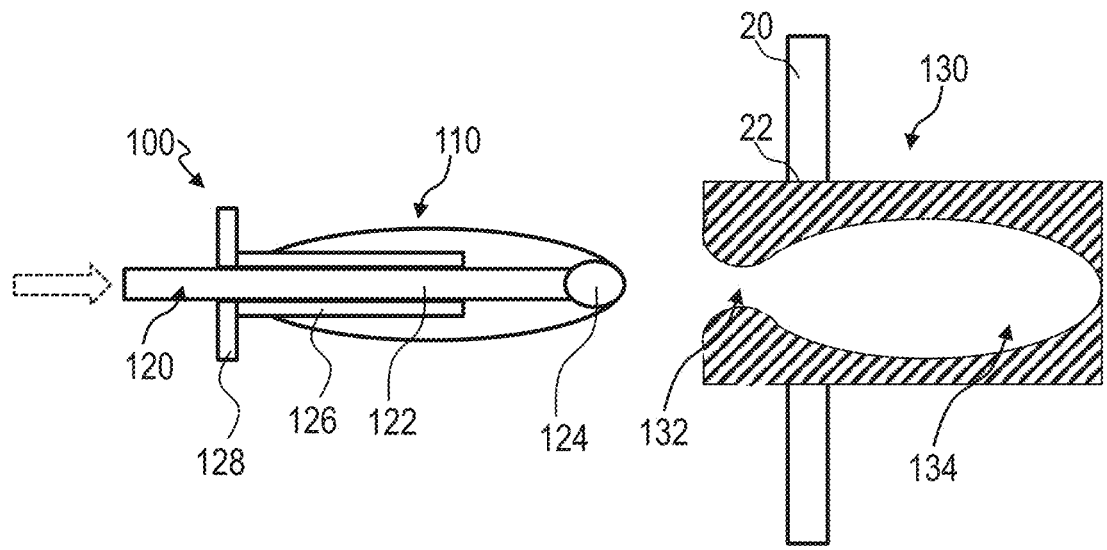
FIG. 4 illustrates another exemplary, elongated fastening element with a housing for fastening a first component to a second component, according to an embodiment.

FIG. 4 illustrates another example of the fastening element 100. In FIG. 4, the body 110 is in its elongated state as described above. Deviating from and optional to the embodiments described above, the fastening element 100 here comprises a housing 130 configured for inserting the body 110. The housing 130 may have an opening 132 and may be configured to selectively accommodate at least a section of the body 110. The body 110 may be insertable into the housing 130 through the opening 132 when elongated and may intersect with the housing 130 when non-elongated and/or deformed back. The housing 130 is configured to be attached to the second component 20, as indicated in FIG. 4. Further, the housing 130 may comprise an accommodation compartment 134 configured to at least partially accommodate the body 110. Further optionally, the accommodation compartment 134 may be configured to be at least substantially airtightly sealable by the body 110.

Figure 5:
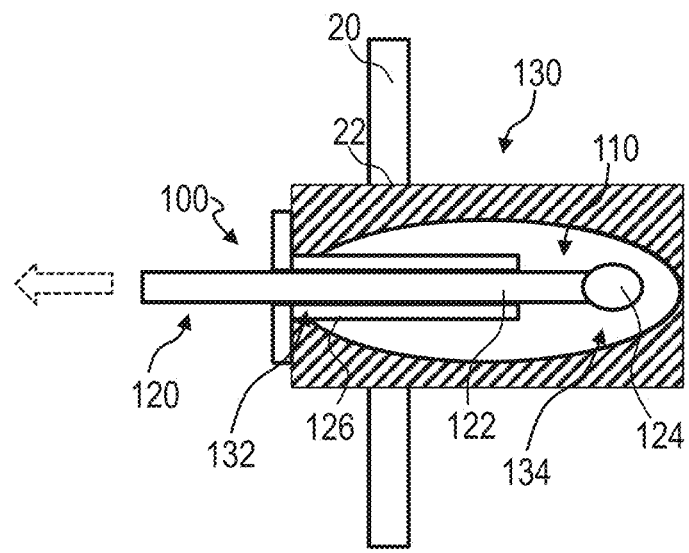
FIG. 5 illustrates the fastening element with the housing illustrated in FIG. 4 in a state in which the fastening element is inserted into the housing and non-elongated.

FIG. 5 illustrates the fastening element 100 with the housing 130 of FIG. 4 after insertion of the body 110 into the housing 130 with its non-elongated, i.e., relaxed, body 110 as the actuating member 120 has been moved further out the body 110. Accordingly, the body 110 intersects the housing 130, thereby causing a form-fit connection. It is noted that, due to the above-mentioned airtightly sealing, the body 110 may create a vacuum under its surface through its expansion and may increase the load resistance of the fastening element 100 or the fastening connection, respectively.

Figure 6:
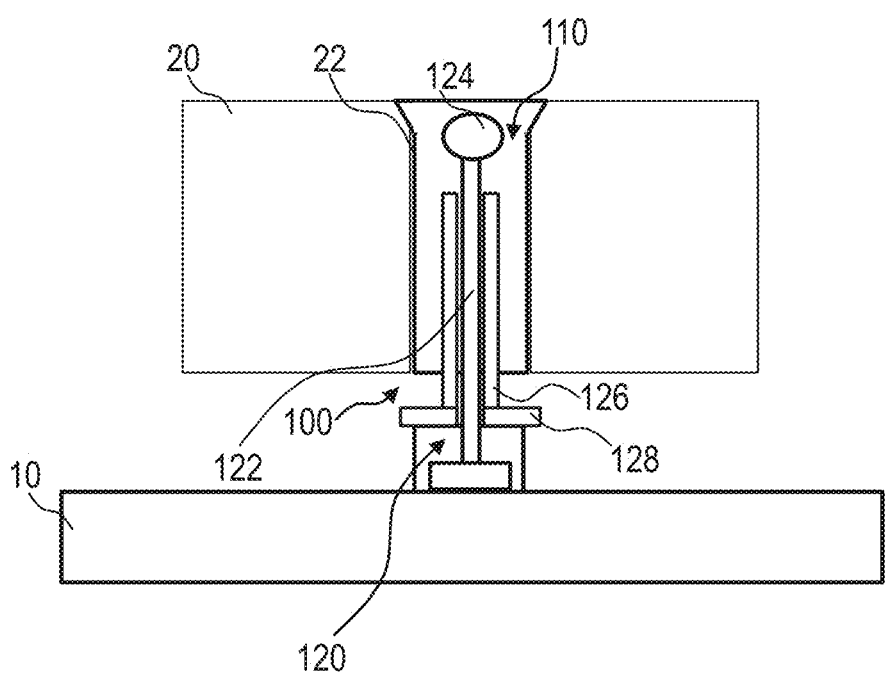
FIG. 6 illustrates another example of the fastening element.

FIG. 6 illustrates another example of the fastening element 100. Here, the above-mentioned shoulder section 112 of the fastening element 100 is omitted. Further, here, the above-mentioned sections 116, 118 having different degrees of hardness are omitted. As mentioned above, those sections 112, 116, 118 are merely optional. Further, FIG. 6 illustrates the fastening arrangement of the fastening element 100 being attached and/or coupled to the second component 20 and the first component 10 being attached and/or coupled to the fastening element 100.

Figure 7:
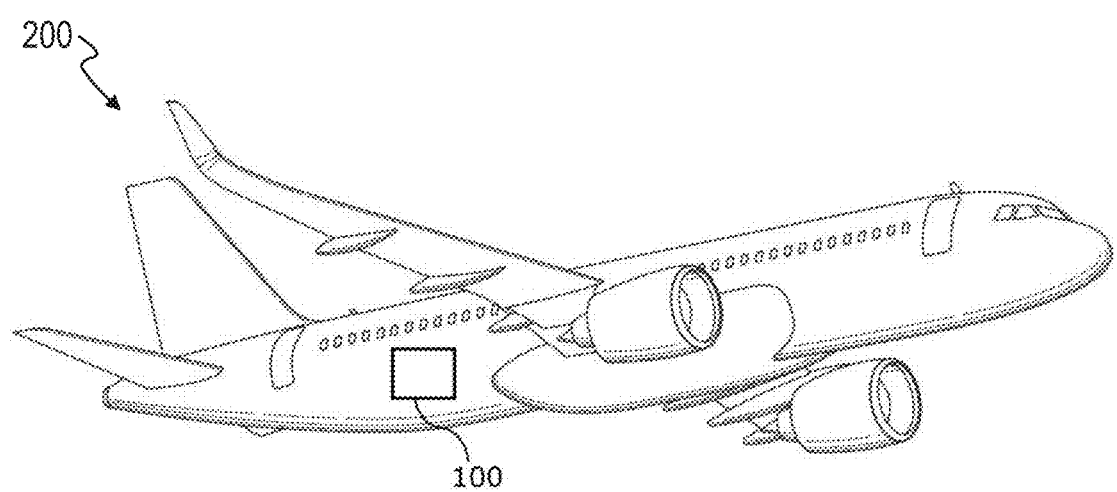
FIG. 7 illustrates an exemplary aircraft to which a fastening element for fastening a first component to a second component according to an embodiment is applied.

FIG. 7 illustrates an exemplary aircraft 200 to which the fastening element 100 described herein is applied. It is noted that the fastening element 100 may also be applied to a vehicle, such as a motor vehicle, or the like.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS 10 first component
20 second component
22 opening
100 fastening element
110 elastic body
112 shoulder section
114 elongatable section
116 section of first hardness
118 section of second hardness
120 actuating member
122 pin-shaped section
124 contact surface
126 guiding member
128 interface section
130 housing
132 opening
134 compartment
200 aircraft

The invention claimed is:

1. A fastening element for fastening a first component to a second component, the fastening element comprising:
a body which is elastically deformable; and
an elongated actuating member, movably guided relative to the body to be selectively movable further into or further out of the body,
wherein the body is configured to be elongated by moving the actuating member further into the body and applying a corresponding load onto the body and to elastically deform back by moving the actuating member further out of the body and releasing the load applied thereto, and the body is configured to have a smaller outer diameter when correspondingly elongated than when at least one of non-elongated or deformed back wherein the body is formed from an elastic plastic material.

2. The fastening element of claim 1, wherein the fastening element is configured to be inserted into an opening of one of the first component and the second component or of a housing when the body is elongated, and to make at least a form-fit connection with the one of the first component and the second component or the housing when the body is at least one of non-elongated or deformed back.

3. The fastening element of claim 1, wherein the actuating member comprises a pin-shaped section insertable or inserted at least in sections into the body and contactable or contacted with an inner side of the body.

4. The fastening element of claim 1, wherein a longitudinal end of the actuating member facing the body has a contact surface configured to be brought into contact with an inner side of the body.

5. The fastening element of claim 1, further comprising a guiding member fixed relative to the body and having a bushing section to guide the actuating member therein.

6. The fastening element of claim 5, wherein the guiding member comprises an interface section arranged outside the body for at least one of gripping by a hand of a user or attaching one of the first component and the second component thereto.

7. The fastening element of claim 1, wherein the body comprises a first section having a first degree of hardness and an adjoining second section having a second degree of hardness, and the second section has a lesser hardness than the first section.

8. The fastening element of claim 1, wherein the body comprises a shoulder section radially expanded and a section elongatable by the actuating member.

9. The fastening element of claim 1, further comprising a housing having an opening and configured to selectively accommodate at least a section of the body, the body being insertable through the opening into the housing when elongated and intersecting with the housing when at least one of non-elongated or deformed back.

10. The fastening element of claim 9, wherein the housing is configured to be attached to one of the first component and the second component.

11. The fastening element of claim 9, wherein the housing comprises an accommodation compartment configured to at least partially accommodate the body, and the accommodation compartment is configured to be at least substantially airtightly sealable by the body.

12. The fastening element of claim 1, wherein the elastic plastic material comprises at least one of a rubber or an elastomer.

13. An aircraft, comprising at least one fastening element according to claim 1 used for fastening a first component to a second component of the aircraft.

14. A fastening element for fastening a first component to a second component, the fastening element comprising:
a body which is elastically deformable; and
an elongated actuating member, movably guided relative to the body to be selectively movable further into or further out of the body,
wherein the body is configured to be elongated by moving the actuating member further into the body and applying a corresponding load onto the body and to elastically deform back by moving the actuating member further out of the body and releasing the load applied thereto, and the body is configured to have a smaller outer diameter when correspondingly elongated than when at least one of non-elongated or deformed back, wherein the body comprises a first section having a first degree of hardness and an adjoining second section having a second degree of hardness, and the second section has a lesser hardness than the first section.

* * * * *